US008799501B2

(12) United States Patent
Adar et al.

(10) Patent No.: US 8,799,501 B2
(45) Date of Patent: Aug. 5, 2014

(54) SYSTEM AND METHOD FOR ANONYMOUSLY SHARING AND SCORING INFORMATION POINTERS, WITHIN A SYSTEM FOR HARVESTING COMMUNITY KNOWLEDGE

(75) Inventors: Eytan Adar, Palo Alto, CA (US); Rajan Mathew Lukose, Palo Alto, CA (US); Caesar Sengupta, Los Altos, CA (US); Joshua Rogers Tyler, Stanford, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 2182 days.

(21) Appl. No.: 10/184,414

(22) Filed: Jun. 27, 2002

(65) Prior Publication Data

US 2003/0204604 A1 Oct. 30, 2003

Related U.S. Application Data

(63) Continuation-in-part of application No. 10/135,540, filed on Apr. 30, 2002, now abandoned.

(51) Int. Cl.
*G06F 15/16* (2006.01)
(52) U.S. Cl.
USPC ........... 709/232; 709/238; 709/202; 709/203; 709/223; 709/250
(58) Field of Classification Search
USPC .................. 709/232, 238, 202, 203, 223, 250
See application file for complete search history.

(56) References Cited

U.S. PATENT DOCUMENTS

| 658,464 | A | * | 9/1900 | Reinli | 280/47.4 |
|---|---|---|---|---|---|
| 3,683,380 | A | * | 8/1972 | Cantwell et al. | 342/90 |
| 5,654,746 | A | * | 8/1997 | McMullan et al. | 725/29 |
| 5,761,692 | A | * | 6/1998 | Ozden et al. | 711/4 |
| 5,936,981 | A | * | 8/1999 | Wada et al. | 372/13 |
| 6,115,709 | A | * | 9/2000 | Gilmour et al. | 707/9 |
| 6,131,123 | A | * | 10/2000 | Hurst et al. | 709/238 |
| 6,154,783 | A | * | 11/2000 | Gilmour et al. | 709/245 |
| 6,230,269 | B1 | * | 5/2001 | Spies et al. | 713/182 |
| 6,233,618 | B1 | * | 5/2001 | Shannon | 709/229 |
| 6,263,455 | B1 | * | 7/2001 | Bannister | 714/25 |
| 6,266,667 | B1 | * | 7/2001 | Olsson | 707/10 |
| 6,360,220 | B1 | * | 3/2002 | Forin | 707/8 |
| 6,529,954 | B1 | * | 3/2003 | Cookmeyer et al. | 709/224 |
| 6,633,315 | B1 | * | 10/2003 | Sobeski et al. | 715/762 |
| 6,658,464 | B2 | * | 12/2003 | Reisman | 709/219 |

(Continued)

FOREIGN PATENT DOCUMENTS

GB 2387680 * 4/2002 ............. G06F 17/60

*Primary Examiner* — Lan-Dai T Truong

(57) ABSTRACT

One embodiment of the method discloses: identifying an information resource accessed by a client computer; generating an information resource pointer including an address for the information resource; and transmitting a pointer message including the information resource pointer over a network. A second embodiment of the method discloses: generating a client profile; storing the profile; receiving a pointer message containing an information resource pointer; scoring the pointer message with respect to the profile; totaling a number of times that the information resource pointer is received, over a predetermined time period; initializing a timeliness score to a maximum value; decrementing the timeliness score by a predetermined percentage each time a predetermined time period elapses after transmission by a sending client computer; generating an aggregate score; and displaying the pointer message and the aggregate score. The system of the present invention, includes all means for implementing the method.

19 Claims, 5 Drawing Sheets

(56) References Cited

U.S. PATENT DOCUMENTS

| | | | |
|---|---|---|---|
| 6,701,362 B1* | 3/2004 | Subramonian et al. | 709/224 |
| 6,711,414 B1* | 3/2004 | Lightman et al. | 455/517 |
| 6,819,908 B2* | 11/2004 | Spratt | 455/3.03 |
| 6,839,435 B1* | 1/2005 | Iijima et al. | 380/251 |
| 6,839,880 B1* | 1/2005 | Morse et al. | 715/513 |
| 6,904,408 B1* | 6/2005 | McCarthy et al. | 705/2 |
| 6,915,284 B2* | 7/2005 | Adar et al. | 706/45 |
| 6,934,964 B1* | 8/2005 | Schaffer et al. | 725/46 |
| 6,968,317 B1* | 11/2005 | Wallace et al. | 705/37 |
| 6,983,320 B1* | 1/2006 | Thomas et al. | 709/224 |
| 7,006,606 B1* | 2/2006 | Cohen et al. | 379/88.18 |
| 7,032,023 B1* | 4/2006 | Barrett et al. | 709/225 |
| 7,085,832 B2* | 8/2006 | Briscoe et al. | 709/224 |
| 7,299,219 B2* | 11/2007 | Green et al. | 707/2 |
| 8,127,220 B1* | 2/2012 | Dean et al. | 715/206 |
| 2001/0027526 A1* | 10/2001 | English et al. | 713/201 |
| 2001/0037317 A1* | 11/2001 | Freiwirth et al. | 705/74 |
| 2002/0059144 A1* | 5/2002 | Meffert et al. | 705/51 |
| 2002/0061512 A1* | 5/2002 | Kim et al. | 435/4 |
| 2002/0073232 A1* | 6/2002 | Hong et al. | 709/238 |
| 2002/0087641 A1* | 7/2002 | Levosky | 709/206 |
| 2002/0087643 A1* | 7/2002 | Parsons et al. | 709/206 |
| 2002/0089539 A1* | 7/2002 | Lindhorst et al. | 345/764 |
| 2002/0095596 A1* | 7/2002 | Williams | 713/200 |
| 2002/0099638 A1* | 7/2002 | Coffman et al. | 705/37 |
| 2002/0112021 A1* | 8/2002 | Detlef | 709/216 |
| 2002/0123980 A1* | 9/2002 | Jenkins et al. | 707/1 |
| 2002/0133584 A1* | 9/2002 | Greuel et al. | 709/224 |
| 2002/0138509 A1* | 9/2002 | Burrows et al. | 707/501.1 |
| 2002/0165813 A1* | 11/2002 | Lee | 705/37 |
| 2002/0169865 A1* | 11/2002 | Tarnoff | 709/223 |
| 2002/0188689 A1* | 12/2002 | Michael | 709/206 |
| 2003/0009495 A1* | 1/2003 | Adjaoute | 707/501.1 |
| 2003/0014270 A1* | 1/2003 | Qureshi et al. | 705/1 |
| 2003/0018659 A1* | 1/2003 | Fuks et al. | 707/500 |
| 2003/0018702 A1* | 1/2003 | Broughton et al. | 709/202 |
| 2003/0020756 A1* | 1/2003 | Bates et al. | 345/788 |
| 2003/0037045 A1* | 2/2003 | Melhado | 707/3 |
| 2003/0046421 A1* | 3/2003 | Horvitz et al. | 709/238 |
| 2003/0056216 A1* | 3/2003 | Wugofski et al. | 725/46 |
| 2003/0069849 A1* | 4/2003 | Stefik et al. | 705/51 |
| 2003/0074580 A1* | 4/2003 | Knouse et al. | 713/201 |
| 2003/0158924 A1* | 8/2003 | DeLegge | 709/223 |
| 2003/0172067 A1* | 9/2003 | Adar et al. | 707/7 |
| 2003/0182428 A1* | 9/2003 | Li et al. | 709/227 |
| 2004/0014457 A1* | 1/2004 | Stevens | 455/414.1 |
| 2004/0111386 A1* | 6/2004 | Goldberg et al. | 707/1 |

* cited by examiner

SYSTEM AND METHOD FOR ANONYMOUSLY SHARING AND SCORING INFORMATION POINTERS, WITHIN A SYSTEM FOR HARVESTING COMMUNITY KNOWLEDGE

CROSS-REFERENCE TO RELATED/CO-PENDING APPLICATIONS

This application relates to and incorporates by reference co-pending U.S. patent application Ser. No. 10/093658, entitled "System And Method For Harvesting Community Knowledge," filed on Mar. 7, 2002, by Adar et al. This related application is assigned to Hewlett-Packard Co. of Palo Alto, Calif. This application is also related to co-pending U.S. patent application Ser. No. 10/122,490, entitled "System and Method for Reducing Peer-to-Peer Network Traffic, Within a System for Harvesting Community Knowledge," filed on Apr. 12, 2002 with inventors Eytan Adar, et al. This application is a continuation-in-part of U.S. patent application Ser. No. 10/135540, entitled "System and Method For Anonymously Sharing and Scoring Information Pointers, Within a System For Harvesting Community Knowledge," filed on Apr. 30, 2002 now abandoned, and herein specifically claims benefit of aid filing date under 35 U.S.C. §120 with respect to all matter disclosed therein.

BACKGROUND OF THE INVENTION

1. Field of the Invention

The present invention relates generally to systems and methods for information sharing and knowledge management, and more particularly for anonymously sharing and scoring information pointers, within a system for harvesting community knowledge.

2. Discussion of Background Art

Satisfying information needs in a diverse, heterogeneous information environment is challenging. This is further complicated in that the total amount of information present in the world today likely exceeds the collective memory of all of mankind. As a result, it's virtually impossible to stay up to date on one's current areas of responsibility without the use of advanced recommendation tools.

In order to even approach the process of finding the right information resources or answers to questions, individuals typically must know either where to look, or whom to ask. Enterprise's employees also need to share information and learn from each other. And there needs to be ways of spreading interesting information between them.

This is a challenging task, especially in large enterprises where many of the members are unaware of each other's skill sets, and of all the information resources available to them. There is a lot of knowledge that one's colleagues possess, the sharing of which would be beneficial to all, however the participation costs of sharing such information tend to be high due to the time spent advertising one's knowledge and the resultant privacy lost by doing so. As a result, oftentimes information is not shared within an enterprise, when it otherwise could have been.

Such challenges become ever more significant, as modern enterprises realize that their value and strength as ongoing ventures depends increasingly upon an ability of their members to easily share information. For example, individual members of an enterprise may need to come up to speed in particular areas of knowledge before beginning their new assignment, or the enterprise itself may need to access its current strengths and weaknesses in various product, services, and research areas. Unfortunately however, meeting these information needs is often an elusive goal for many enterprises.

Current systems for collecting information and organizational expertise include Knowledge Databases (K-bases), such as document repositories and corporate directories, and Knowledge Management systems, which rely on users to explicitly describe their personal information, knowledge, and expertise to a centralized K-base.

FIG. 1 is a dataflow diagram of a conventional knowledge management system 100. In a typical architecture, information providing users 102 explicitly decide what descriptive information they provide to a central database 104. An information seeking user 106 then performs a query on the central database 104 in order to find an information provider who perhaps may be able to answer the seeker's question.

There are several significant problems with such systems. Knowledge management systems, like that shown in FIG. 1, require that information providers spend a significant amount of time and effort entering and updating information on the central database 104. For this reasons alone, such systems tend to have very low participation rates. In addition, even information providers, who take time to enter and update such information, may accidentally or purposefully misrepresent their personal information, levels of knowledge, and expertise. Furthermore, they may neglect or be unable to reveal much of their tacit knowledge. Tacit knowledge is commonly known as knowledge a user possesses, but which the user considers trivial, or may not even be consciously aware of.

Because of the inaccuracy and/or incompleteness of such information, it can be difficult for information seekers to come up to speed in an area of technology or for enterprises to access their current strengths and weaknesses Also, current recommendation engines require that a user's personal information be stored on centralized servers, before data mining and collaborative filtering algorithms can be run in order to provide the user with information source recommendations. Such systems claim not to store any identifiable information about the user, however the user's personal data does leave their local machines resulting in a loss of privacy and anonymity.

Other recommendation engines, such as Firefly (owned by Microsoft Corp.), DirectHit (owned by AskJeeves), and those operating at www.amazon.com are purely server based, have no anonymity, and are limited to recommendations about pointers that are specific to their service.

In response to the concerns discussed above, what is needed is a system and method for reducing the participation costs of information sharing and enhancing the proliferation of knowledge within a company that overcomes the problems of the prior art.

SUMMARY OF THE INVENTION

The present invention is a system and method for information discovery. One embodiment of the method of the present invention includes the steps of: identifying an information resource accessed by a client computer; generating an information resource pointer including an address for the information resource; and transmitting a pointer message including the information resource pointer over a network.

A second embodiment of the method of the present invention includes the steps of: generating a client profile on a client computer; storing the profile on the computer; receiving a pointer message containing an information resource pointer; scoring the pointer message with respect to the profile; and displaying the pointer message and score on the computer.

A third embodiment of the method of the present invention includes the steps of: receiving a pointer message at a client computer over a network, containing an information resource pointer; totaling a number of times that the information resource pointer is received by the client computer, over a predetermined time period; and displaying the pointer message and total on the computer.

A fourth embodiment of the method of the present invention includes the steps of: receiving a pointer message transmitted by a client computer over a network, containing an information resource pointer; initializing a timeliness score to a maximum value; decrementing the timeliness score by a predetermined percentage each time a predetermined time period elapses after transmission by the client computer; and displaying the pointer message and the timeliness score on the computer.

The system of the present invention, includes all means for implementing the method.

These and other aspects of the invention will be recognized by those skilled in the art upon review of the detailed description, drawings, and claims set forth below.

DETAILED DESCRIPTION OF THE PREFERRED EMBODIMENT

Figure 1:
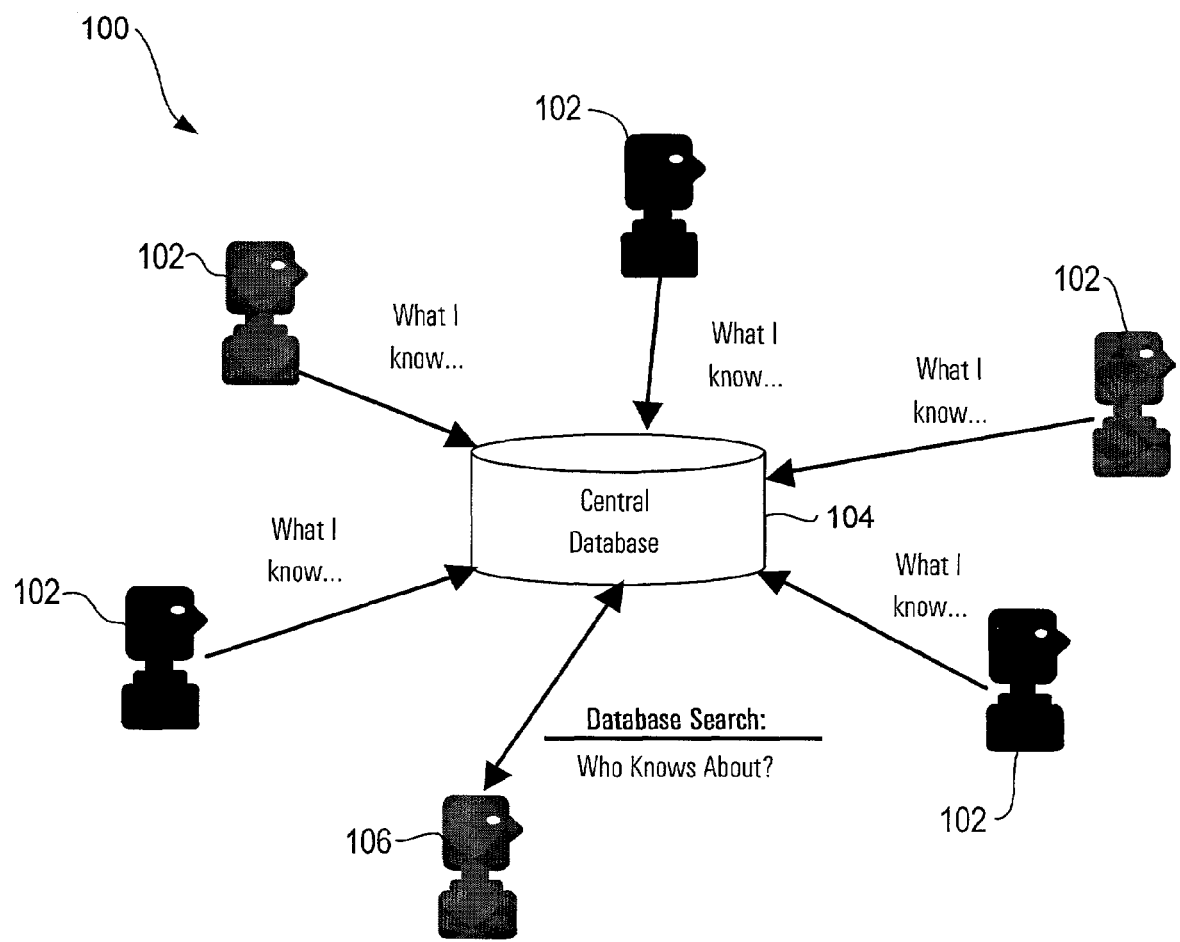
FIG. 1 is a dataflow diagram of a conventional knowledge management system.
Figure 2:
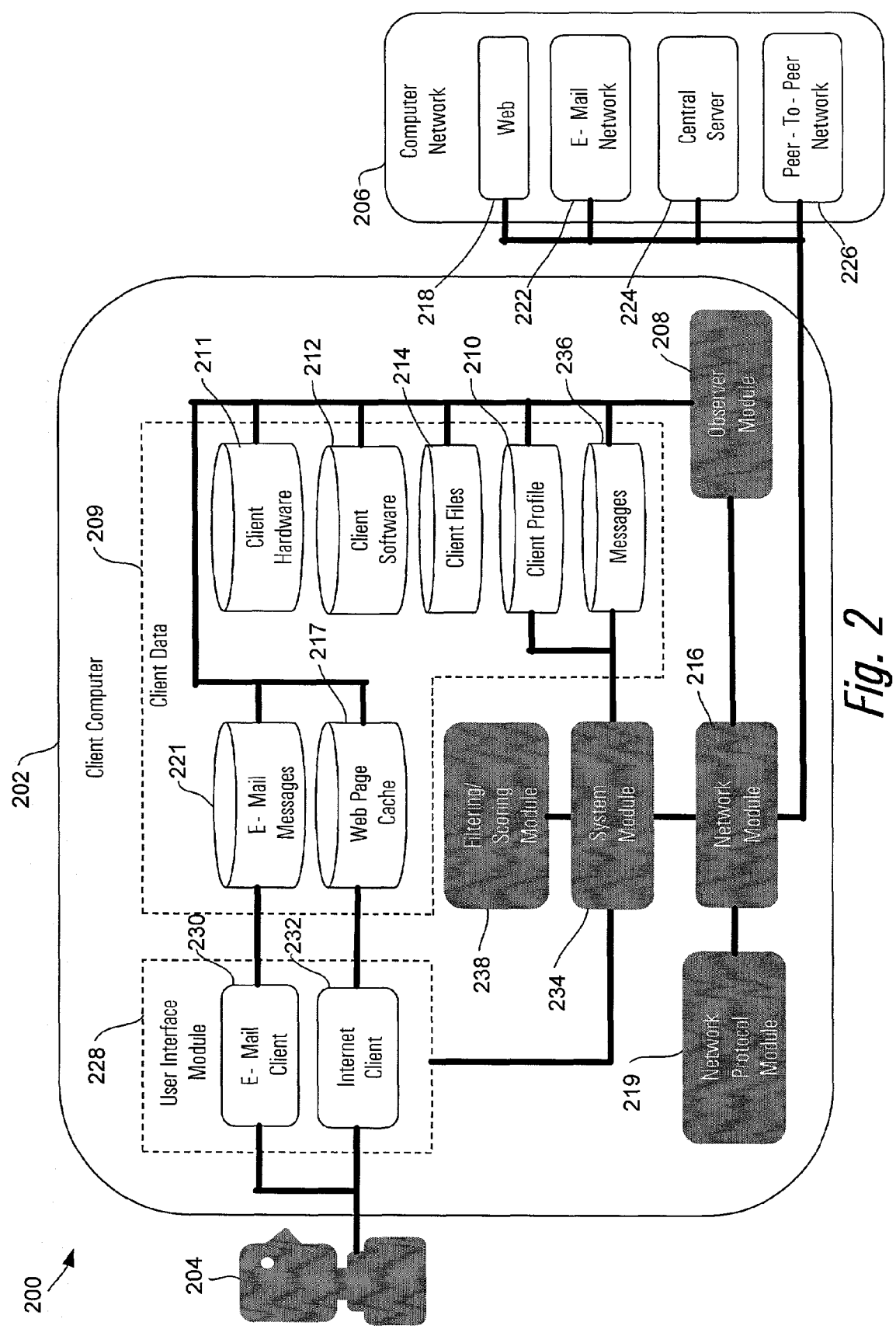
FIG. 2 is a dataflow diagram of one embodiment of a system for harvesting community knowledge.
Figure 3:
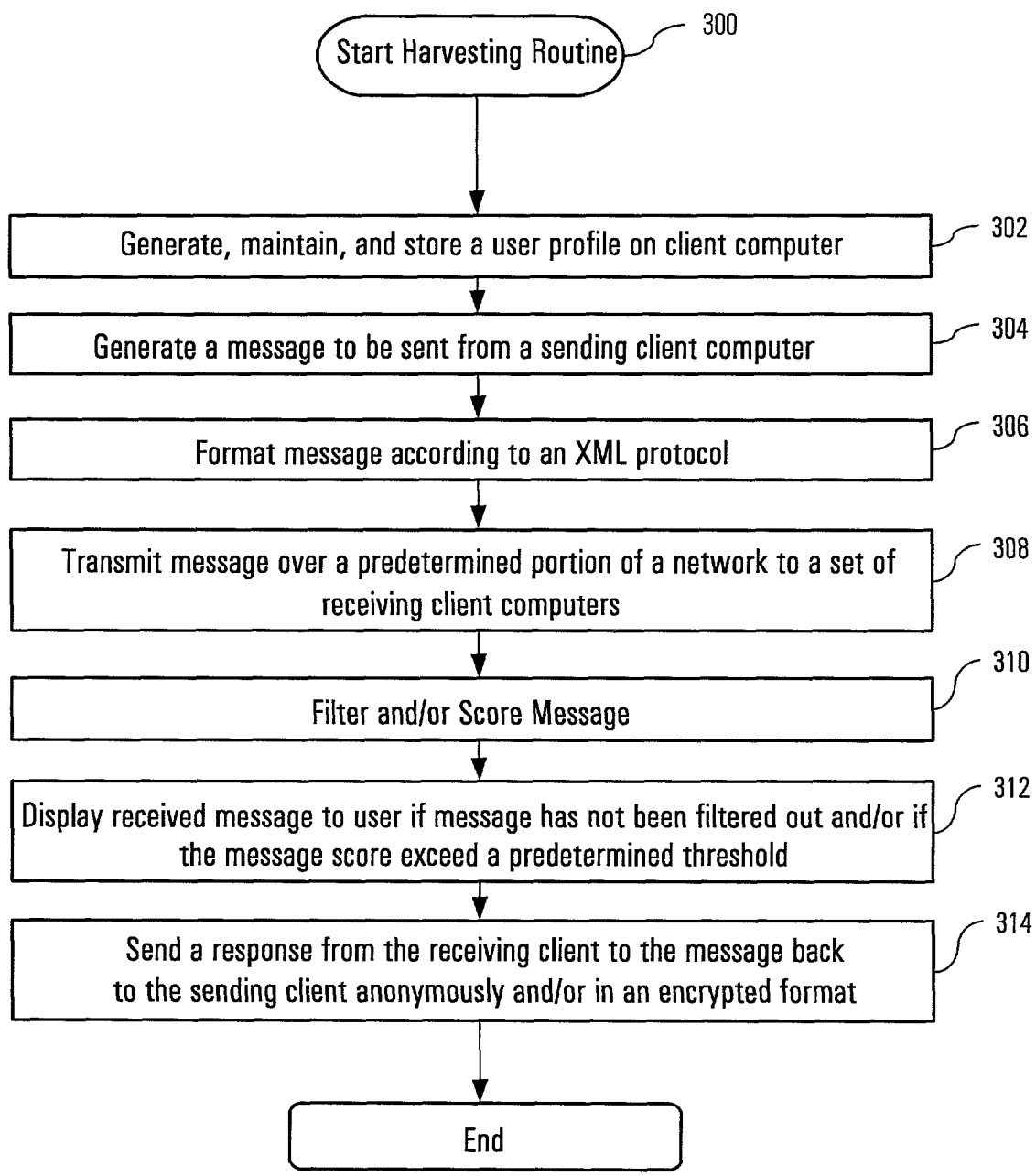
FIG. 3 is a flowchart of one embodiment of a method for harvesting community knowledge.

FIG. 2 is a dataflow diagram of one embodiment of a system 200 for harvesting community knowledge. FIG. 3 is a flowchart of one embodiment of a method 300 for harvesting community knowledge. FIGS. 2 and 3 are herein discussed together. The system 200 includes a client computer 202 under the control of a user 204, and connected to a computer network 206. The client 202 both sends and receives messages respectively to and from other client computers and information sources via the network 206. When a client computer generates and sends a message such client computer is herein alternately called a sending client, and when a client computer receives a message, such client computer is herein alternately called a receiving client. Preferably all client computers on the network include the same functionality, which is now described with respect to the client computer 202, however some receiving clients may not currently have the present invention's software installed.

User Profiling

The method 300 begins with an observer module 208 generating and maintaining a client profile 210 on the client computer 202, in step 302. The observer module 208 begins a process of generating and maintaining the client profile 210 by monitoring and collecting data with respect to both internal and external computer 202 information and operations. Internal data includes: user 204 behavior on the computer 202, installed client hardware 211, installed client software 212, and locally stored client files 214. External data includes: a web page cache 217 populated through internet client 232 interactions with web 218 sites, and e-mail messages 221 populated through e-mail client 230 interactions with an e-mail network 222. User operations, in addition to the term's normal meaning, is herein defined to include together or in the alternative: user behavior on the client computer 202; any information about the user; any information about the client computer 202; and/or any information about the computer's 202 interaction with the network 206.

During the monitoring process, selected data is captured, processed, and added to the client profile 210. The selected data is then automatically analyzed and formatted for storage in the client profile 210. Thus, the observer module 208 relieves the user 204 from having to manually describe themselves to other users on the network 206. This dramatically reduces the participation costs for all users of the present invention, while ensuring that the client profile 210 is constantly kept up to date. Thus the client profile 206, as generated and maintained by the present invention, serves as a very rich and detailed data structure for enabling the user 204 to efficiently and equitably participate in an information market.

In order to maximize the user's 204 privacy and thereby encourage broad user participation within the information market, the client profile 210 is preferably stored only on the client computer 202, however the profile 210 may also be stored remotely either in encrypted or password protected form and viewable only by the user 204. Also to toward this goal, the user 204 is also preferably given an option of erasing their client profile 210, or having the observer 208 rebuild a new client profile for the user 204.

Message Generation

Next to be described is a system and method for generating messages in step 304 using the present invention. Messages are herein defined to include a wide variety of communications known to those skilled in the art, including any communication seeking, sending, and/or culling information from an information market. Thus messages can include questions, announcements, and/or information processing routines.

To begin, the user 204 accesses a user interface module 228. The user interface module 228 preferably includes a set of software modules for interfacing with the user 204. Such modules at a minimum include the e-mail client 230, which stores a predetermined set of e-mail messages 221, and the Internet client 232, which stores information in the web page cache 217. These two modules 230 and 232 provide the user 204 with alternate ways of using the present invention and preferably, both contain similar functionality, such as text windows and folders for storing messages both sent and received.

Through the user interface module 228, the user 204 initiates the message generating process, such as by clicking on an "Ask a Question" button in a toolbar within the user interface. In response, the user interface module 228 displays a number of pre-defined message types to the user 204.

One message type example is a "Find an Expert" message. The find an expert message is likely to be one of the more popular questions asked by the user 204. The find an expert message includes a message field, an anonymous check box, and an optional filters field. The message field collects information provided by the user 204 which the user believes will help the present invention direct the message to receiving clients likely to be able to either answer the user's 204 question or be apprised of the user's 204 interest in some knowledge area and inviting further communication. The more detail the user 204 provides in the message field, the better directed will be the message to an appropriate set of receiving clients. The anonymous check box, if checked, directs the message to be sent only over a peer-to-peer network 226, using randomization, without any information explicitly identifying the user's identity. Users of the present invention are expected to direct a large amount of message traffic over the peer-to-peer network 226 in order to maintain their anonymity. The optional filters field permits the user 204 to target the message to a set of receiving clients satisfying one or more filtering conditions.

The network module 216 periodically scans the message database 236 for new messages generated by the user 204. Then in step 306, a network protocol module 219 formats the new message according to an XML (Extensible Markup Language) protocol for transmission by the network module 216 over the network 206. Both a client computer sending the message and a client computer receiving the message must be apprised of the particular XML protocol used to format the message, in order for communication to occur.

Preferably the peer-to-peer network 226 is limited to an enterprise's intranet so that only a predetermined set of client computers on the network 206 may have an opportunity to respond to the message. By limiting the scope of users allowed to see messages, a baseline level of confidentiality, expertise, and/or message response integrity may be maintained. For instance, the scope of users may be limited to only those who are employed within a particular enterprise, who belong to a particular professional society, or who are students and one or more universities. The exact scope of users will thus depend upon a particular application of the present invention.

In alternate embodiments, messages may be transmitted over global e-mail and/or web networks, but in an encrypted format which again limits the scope of users. In other embodiments, there may be no limits on the scope of users who may be given an opportunity to respond to the messages.

Message Transmission

Next in step 308, the network module 216 transmits the message over a predetermined portion of the computer network 206. Messages transmitted over the peer-to-peer network 226 achieve a high level of anonymity, however many messages will likely be transmitted over the e-mail network 222 or displayed on a web 218 site in order to advertise the present invention and thereby build-up the peer-to-peer network 226.

As mentioned above, when the computer client 202 transmits a message over the network 206 it is called a sending client, while when the computer client 202 receives a message over the network 206 it is called a receiving client. Thus in normal operation, all client computers function as both sending and receiving clients.

The present invention thus encourages a high level of participation and sharing of expertise by permitting users to maintain privacy and anonymity. User privacy is preserved by storing the user's 204 client profile 210 preferably only on the client computer 202 thereby encouraging users to permit the building of very rich profiles which go far beyond those users would otherwise voluntarily disclose to a central database. User anonymity is preserved by transmitting messages over the peer-to-peer network 226.

Message Filtering and Scoring

For purpose of the discussion to follow, functionality within the client computer 202 for processing received messages is discussed as if the client computer 202 was one of the receiving client computers. Such a context switch is appropriate because preferably each client computer contains a complete and self contained version of the present invention's software.

Thus in step 310, the system module 234 within the client computer 202 retrieves, and commands a filtering/scoring module 238 to filter and score, newly received messages which have been stored in the messages database 236.

In order to perform filtering and scoring, the filtering/scoring module 238 compares the message with information stored in the user's 204 client profile 210. If necessary however, the message may be compared with data stored elsewhere in the client computer 202, such as in the e-mail client 230, the e-mail messages 221, the internet client 232, the web page cache 217, the client software 212, the client files 214, and the client messages 236.

A received message is filtered by the filtering/scoring module 238 when such message contains a predetermined set of criteria, inserted by the message sending client, in order to target selected receiving clients. Such filtering criteria is preferably very flexible and is left at the discretion of the sending client user. For example, the filtering criteria may look for a particular data string, or at some other information within a receiving client's client profile 210.

In an alternate embodiment however, a client profile 210 which does not meet the filtering criteria merely results in a low message score. In this way, a message which does not meet the filtering criteria does not automatically prevent the user 204 from seeing the message. In such embodiments an overall weighted average score may be generated which depends upon not only all of the filtering criteria, but also the message's score. How the message's score is generated is discussed next.

The filtering/scoring module 238 preferably scores messages using statistical information retrieval techniques, including linguistic analysis. Information retrieval techniques are commonly known to be used for accessing and analyzing large blocks of data and then extracting all or selected portions of such data according to a wide variety of methods. Other techniques are also known to those skilled in the art.

While the above filtering and scoring discussion assumes the message was received over the peer-to-peer network 226, messages received over the e-mail network 222 as well as by other paths within the network 206 are similarly filtered and scored if the receiving client has the present invention's software installed.

For example, receiving clients who have the present invention's software already installed and have received an e-mail message containing an embedded XML message, have a copy of the embedded message placed in their messages database 236 so that the message can be filtered and scored. Receiving clients who do not have the present invention's software installed, however, only see the e-mail message in their standard e-mail inbox, and no other processing is performed.

Thus the filtering and scoring techniques of the present invention in combination with the rich client profiles stored on each receiving client's computer are together what enable messages to be brought to the attention of the right set of users.

Such intelligently targeted messaging, however, also builds user confidence in and reliance on the present invention. This is because unlike in conventional systems where users often have to wade though in-boxes full of junk or marginally useful e-mail, users using the present invention generally know and rely on the fact that their time will not be wasted on such unimportant messages. Instead users of the present invention will be even more likely to timely respond to messages received because the messages will be so on-point to their expertise and/or interests.

For example, in the past when a sending client needed to identify appropriate participants to participate in an experiment, or submit papers for a seminar, the user would clumsily post an advertisement on a web or other site, and/or send out a generalized e-mail to a very large distribution list. In such cases, targeted users often miss the importance of or are annoyed by such communications which are buried in a sea of information they already are trying to sift through. In contrast, the present invention automatically performs the necessary sifting so that if a user receives a message using the present invention, such message will be useful to them.

Message Display and Response

In step 312, the received message is displayed to the receiving client if the message has not been filtered out and/or if the message score exceeds a predetermined threshold. Messages are preferably displayed to the receiving client according to their respective score. As discussed above, the score represents a likelihood that the receiving client will find the message relevant to or within their expertise.

The receiving client then may select and respond to one of the messages. In step 314 a response from the receiving client is sent over the network 206 back to the sending client anonymously or in an encrypted format. After step 314 the preferred method ends.

Processing Information from Other Sources Using the Present Invention

While the present invention has been discussed with respect to the generation, transmission and response to messages, the present inventions' scoring functionality is equally applicable toward processing other types of information as well. Other information includes data displayed within a current web page being viewed by the user 204. A relevance vector could be generated from said web page data and compared to the user's 204 expertise vector generated from the client profile 210. User's would be notified of a particular relevance of the currently viewed web page if the relevance and expertise vectors when compared yield a score which exceeds a predetermined threshold. In this way user's browsing the web could be apprised of particular web pages which may closely align with their interests and/or expertise.

Other information similarly processed and scored may include: normal e-mail messages which have not been generated using the present inventions' functionality; files downloaded from the central server 224 or received from some other source; or expertise information stored on a central enterprise database. Those skilled in the art will know of other information sources to which the present invention may also be successfully applied.

Recommendation Engine

Figure 4:
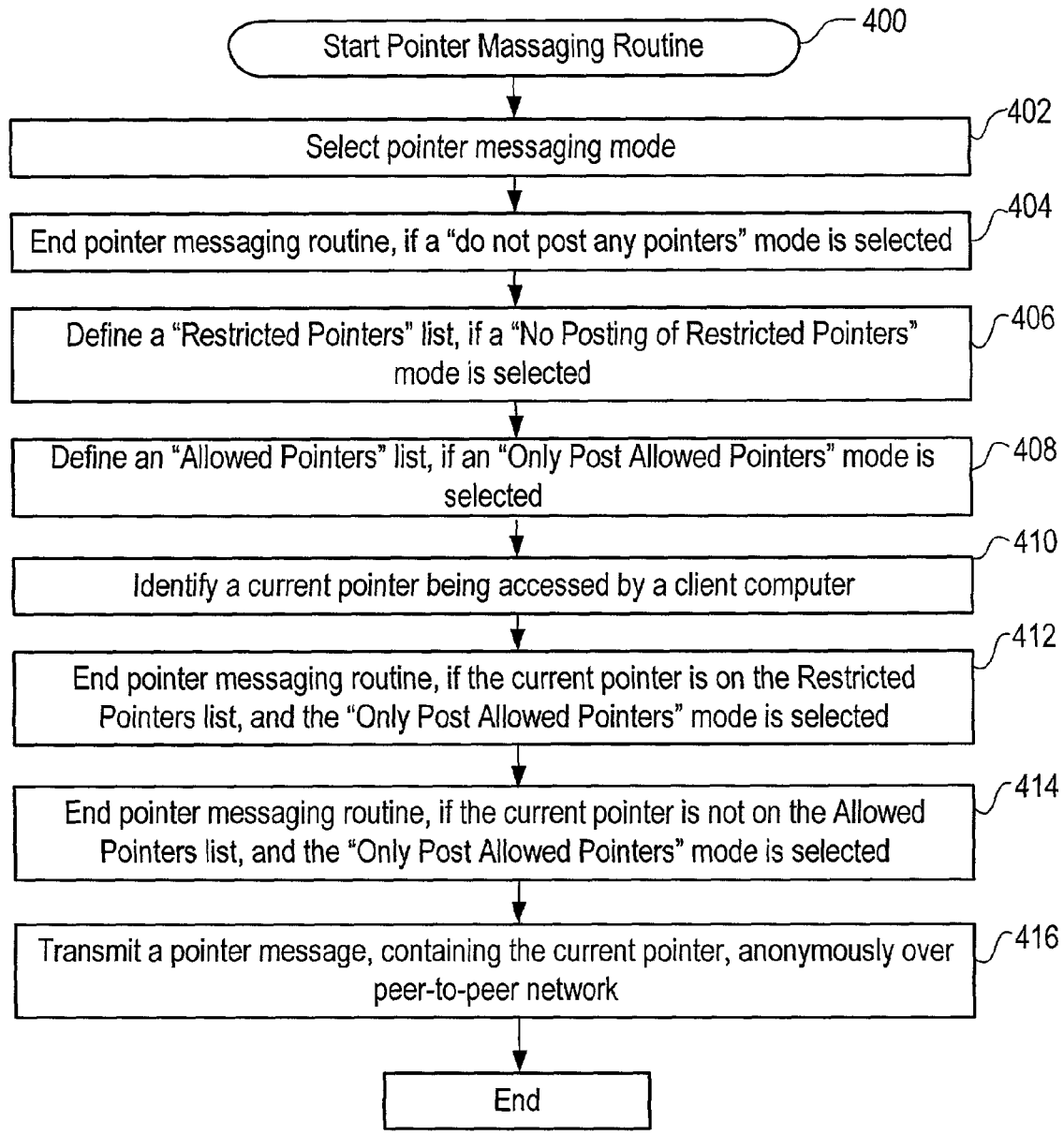
FIG. 4 is a flowchart of one embodiment of a method for pointer messaging.

FIG. 4 is a flowchart of one embodiment of a method 400 for pointer messaging. The method 400 begins in step 402 where the client computer 202, functioning as a sending client, selects a pointer messaging mode, either in response to a user 204 command or in response to a pre-programmed process. Pointers in the present context preferably refer to an address which uniquely designating an information resource which can be accessed by one or more client computers over the network 206. Pointers include path names, hyperlinks, URLs, Outlook Entities (messages/calendar/postings items), remote procedure calls (e.g. SOAP calls), and database requests, and can refer to data, files, documents, web pages, or any other information resources. The information resource may be located either on one or more of the client computers, or on any of the other resources on the network 206.

Next in step 404, the system module 234 ends the pointer messaging method 400, if a "do not post any pointers" mode is selected. Then in step 406, the system module 234 defines a "Restricted Pointers" list, if a "No Posting of Restricted Pointers" mode is selected. The "Restricted Pointers" list can be generated either in response to user 204 input or in response to a pre-programmed process. In this mode only certain predefined pointers cannot be broadcast over the network 206. Such pointers may refer to sensitive or confidential information.

In step 408, the system module 234 defines an "Allowed Pointers" list, if an "Only Post Allowed Pointers" mode is selected. The "Allowed Pointers" list is also generated either in response to user 204 input or by a pre-programmed process. In this mode only certain predefined pointers can be broadcast over the network 206.

Thus in summary, depending upon which approach is more efficient, pointer messaging can be limited in either a negative or positive way, using the "Restricted" or "Allowed" pointers lists, respectively.

Next, in step 410, the system module 234 monitors the user interface module 228, the network module 216, and any other resource on the client computer 202 and identifies a current pointer being accessed by the client computer 202. In step 412, the system module 234 ends the pointer messaging routine 400, if the current pointer is on the Restricted Pointers list. The system module 234, in step 414, also ends the pointer messaging routine 400, if the current pointer is not on the Allowed Pointers list and the "Only Post Allowed Pointers" mode has been selected.

Then in step 416, if the current pointer has not otherwise been excluded, the system module 234 commands the network protocol module 219 to format and transmit a pointer message, containing the current pointer, anonymously, using the peer-to-peer network 226. Password and/or other permissions, required to access the information resource addressed by the current pointer, however, may or may not be included within the pointer message.

In alternate embodiments of the system 200, the user 204 can exercise some manual control over which pointers are ultimately transmitted in step 416. For example, the user 204 can press a "recommend this" button, which manually transmits a pointer over the network 226, regardless of whether the pointer was on either the restricted or allowed pointers lists. Similarly, the user 204 can be presented with a dialog window indicating that a pointer is about to be transmitted over the network 206 and requesting the user's 204 permission to do so (e.g. "I'm about to recommend these, ok?").

Since the pointer message is preferably generated automatically, by the system module 234, the user's 204 participation costs are minimized and thus a greater and more diverse set of pointer messages can be broadcast over the network 206, while still allowing users 204 to maintain their anonymity. After step 416, the preferred method 400 ends.

Figure 5:
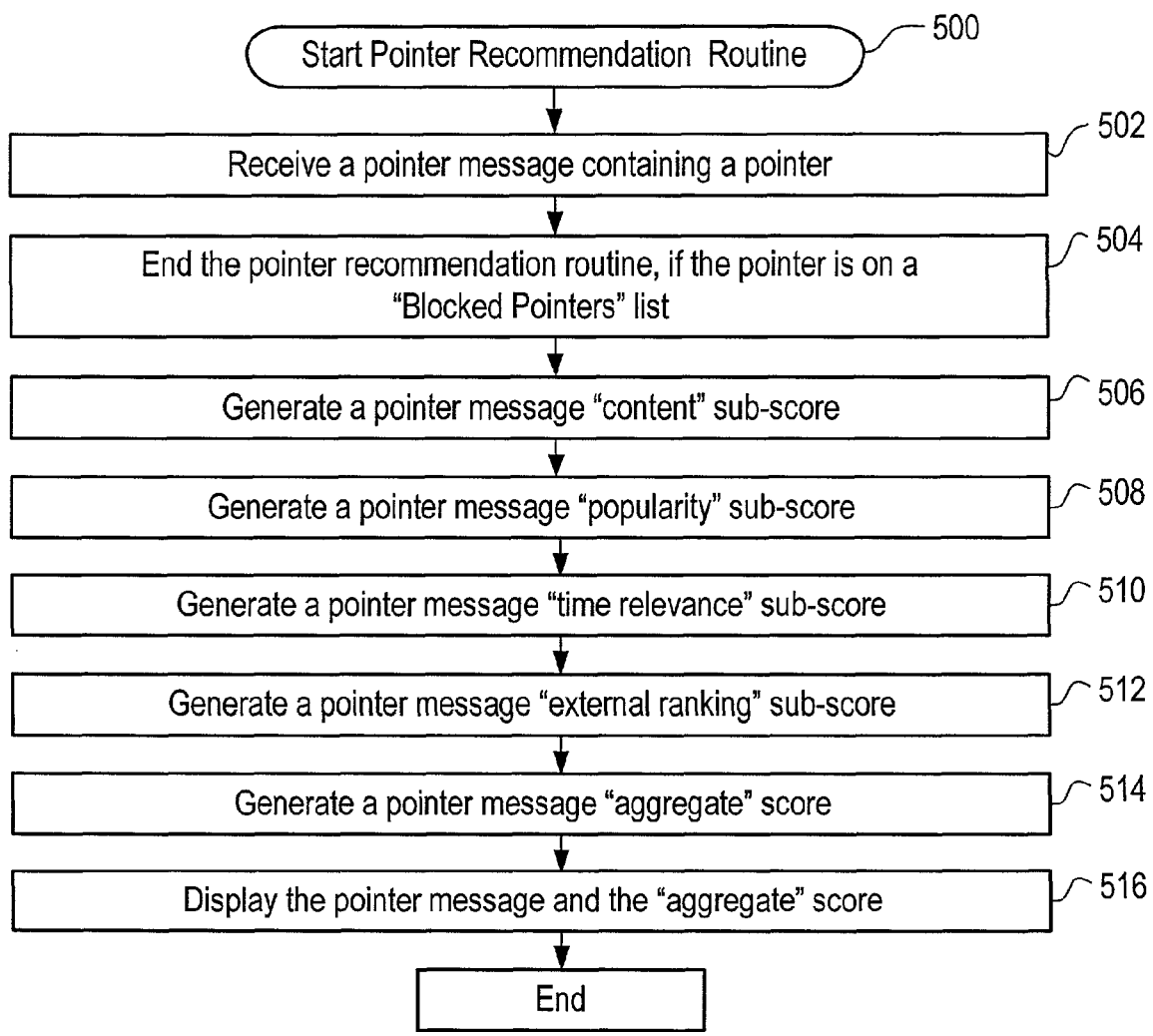
FIG. 5 is a flowchart of one embodiment of a method for pointer recommendation.

FIG. 5 is a flowchart of one embodiment of a method 500 for pointer recommendation. The method 500 begins in step 502 where the client computer 202, functioning as a receiving client, receives a pointer message containing a received pointer. In step 504, the system module 234 ends the pointer recommendation routine 500, if the received pointer is on a "Blocked Pointers" list. The "Blocked Pointers" list can be generated either in response to user 204 input or in response to a preprogrammed process. Blocked pointers are those which the client computer 202 is programmed to ignore. Blocked pointers may include pointers within a pointer message. Such pointers may refer to pop-up "spam," advertisements, and low quality information resources. Blocked pointers may also be based on a particular sending client's identity, such as an e-mail address or other identifying information, or may refer to information resources which the client computer 202 does not have a password or permission to access.

Blocked pointers may be either individually or hierarchically defined. If a blocked pointer is individually defined, only that pointer will be blocked. If however, a blocked pointer is hierarchically defined, not only will that pointer, but also all sub-pointers will be blocked. For example, if the hierarchically blocked pointer is www.pointer.com, then sub-pointers, such as www.pointer.com/fileA, and www.pointer.com/fileB, will also be blocked.

Next in step 506, the system module 234 generates a pointer message "content" sub-score, which is a first of several sub-scores calculated for each pointer message. The content sub-score is calculated by comparing the information resource, which is pointed to by the received pointer, to the client profile 210 of the receiving client using the linguistic and statistical techniques discussed in the Message Filtering and Scoring section of this disclosure. The client computer's 202 privacy continues to be preserved, since the client profile 210 is, as previously discussed, stored only on the client computer 202.

In step 508, the system module 234 generates a pointer message "popularity" sub-score, which is another sub-score preferably calculated for each pointer message. The popularity sub-score is generated by totaling a number of times, within a predetermined time period, the received pointer is transmitted over the computer network 206. By selecting a predetermined time period ending in today's date, or this hour, the current "buzz" within an enterprise can be known.

In step 510, the system module 234 generates a pointer message "time relevance" sub-score, preferably calculated for each pointer message. The time relevance score is a timeliness score which characterizes how recently the pointer message was transmitted. The time relevance score is preferably initialized to a predetermined maximum value which is then decremented by a predetermined percentage as a time elapsed from a first transmission by the sending client increases. The time relevance sub-score may also be affected by how frequently information changes at the information location which the pointer message points. For example, pointers to sites which change often, such as new web sites (e.g. www.cnn.com), could have their time relevance scores decremented at a higher rate since the information pointed to may be accessible for only brief periods of time.

In step 512, the system module 234 generates a pointer message "external ranking" sub-score for each pointer message. The external ranking score is generated by sending a pointer to one or more "ranking/search engines," such as Google's "PageRank" engine, and in response receiving an external ranking score.

Depending upon how the system 200 is configured, one or more of the sub-scores are then combined into a pointer message "aggregate" score, in step 514. The aggregate score is calculated by assigning a predetermined weight to each of the sub-scores and then adding the weighted sub-scores. Preferably the aggregate score is periodically updated at predetermined times, taking into consideration how the sub-scores change over time.

Those skilled in the art will recognize that there are a great number of ways to meaningfully weight each of the sub-scores. Each sub-score's assigned weight is determined empirically, as a function of the present invention's operating environment. In addition, the sub-scores used to calculate the aggregate score can be varied from time to time, in response to systems administrator commands. Also, those skilled in the art will recognize that additional sub-scores may also be calculated and combined into the aggregate score.

In step 516, the pointer message and its associated "aggregate" score is stored within the message database 236 within the client computer 202 and displayed to the user 204 through the user interface module 228. A predetermined aggregate score threshold can be specified, however, which causes only those pointer messages having higher aggregate scores to be stored and displayed. Pointer messages consisting solely of blocked pointers will not preferably be stored or displayed. After step 516, the preferred method 500 ends.

In alternate embodiments of the system 200, the central server 224 can generate a "what's hot" pointer list everyday which is transmitted to all client computers every day. For example, the "what's hot" pointer list could point to technical news stories, which other users one the network 206 have looked at. In such an embodiment, steps 504 through 516 would be skipped, and instead the entire "what's hot" pointer list would be displayed to the user 204.

In another alternate embodiment of the system 200, the system module 234, in step 516, can be configured to prevent pointer messages from being displayed if, the "don't post any pointers" mode has been selected. This is in order to discourage "free-riding" and a dearth of pointer information over the network 226. The user 204 can then be presented with a dialog window mentioning that a potentially highly relevant pointer message has been received, but that the user must "deselect" the "don't post any pointers" mode or alternatively, transmit a predetermined number of pointer messages over the network 226, before any received pointer messages will be displayed. This is an embodiment where a user "has to give in order to get."

In another alternate embodiment of the system 200, the system module 234 monitors which of the pointer messages displayed in step 516 are actually selected and accessed by the receiving client computer. Then the system module 234 generates and transmits "a pointer followed" message over the network 226 which other resources on the network 206 can monitor and process in order to determine such things as which pointers are being followed and which users 204 tend to send pointers which others follow (e.g. ("epicenters of information-quakes").

In another alternate embodiment of the system 200, the user 204 selects a set of pointers and wants to know whether or not other users on the network 206 have followed them. Thus, the client computer 202 transmits the set of pointers over the network 206. The user 204 then receives back messages from the other users indicating whether or not such users have actually accessed information corresponding to one or more of those pointers. The client computer 202 then generates a sub-score reflecting how many other users have followed each pointer in the set.

In another alternate embodiment of the system 200, the client computer 202 receives a set of recommended pointers from a single source. The system module 234 then checks if the user 204 has previously followed any of the set of pointers (i.e. if there is "overlap"). If the user has followed at least one of the pointers in the set, then those pointers which the user has not followed are preferably displayed to the user 204, under an assumption that the set of pointers from the single source are related and that if the user 204 had followed one of the pointers already, the user 204 will likely be interested in the other pointers too. Those pointers which the user 204 has previously followed are preferably not displayed to the user 204.

Alternatively, the system module 234 can be configured to assume that if the user 204 followed only a few of the pointers in the set, the user 204 will then likely not be interested in the other pointers and thus none of the pointers in the set would be displayed to the user.

While one or more embodiments of the present invention have been described, those skilled in the art will recognize that various modifications may be made. Variations upon and modifications to these embodiments are provided by the present invention, which is limited only by the following claims.

What is claimed is:

1. A method for software execution for information discovery, comprising:
   generating a client profile on a client computer;
   storing the client profile on the client computer;
   receiving a pointer message containing an information resource pointer that refers to an address of an information resource that is accessible by a receiving client computer over a network;
   comparing, by the client computer, the information source pointed to by the pointer message to the client profile stored on the client computer;
   determining a content score of the pointer message based on the comparison;
   determining a total number of times the pointer message is transmitted over the network within a predetermined time period;
   determining a popularity score of the pointer message from the determined total number of times;
   determining an aggregated score based on the content score and the popularity score of the pointer message; and
   displaying the pointer message and the aggregated score on the client computer.

2. The method of claim 1, wherein the information resource pointer includes hyperlinks and Universal Resource Locators (URLs).

3. The method of claim 1, further comprising:
   generating a "what's hot" pointer list of information resource pointers frequently transmitted over the network.

4. The method of claim 1, further comprising:
   detecting if the client computer is configured to prevent transmission of pointer messages generated by the client computer; and
   preventing received pointer messages from being displayed if so configured.

5. The method of claim 1, further comprising:
   transmitting a message over the network indicating whether the client computer has followed the information resource pointer.

6. The method of claim 1, further comprising:
   transmitting a set of information resource pointers over the network; and
   receiving back messages from other users indicating whether or not such users have actually followed one or more pointers within the set.

7. The method of claim 1, further comprising:
   receiving a set of information resource pointers from a single source;
   checking whether the client computer has previously followed any of pointers within the set; and
   displaying those pointers in the set which the client computer has not previously followed.

8. The method of claim 1, further comprising:
   obtaining an external ranking score of the pointer message from a ranking engine external to the client computer, wherein the aggregated score is further determined based on the external ranking score.

9. The method of claim 1, further comprising:
   determining a timeliness score of the pointer message by determining a most recent time that the pointer message was transmitted over the network,
   wherein the aggregated score is further determined based on the timeliness score.

10. The method of claim 9, wherein determining the timeliness score of the pointer message comprises:
    initializing the timeliness score to a maximum value; and
    decrementing the timeliness score by a predetermined percentage each time a predetermined time period elapses after a first transmission of the pointer message by a sending client computer.

11. A method for software execution for information discovery, comprising:
    receiving a pointer message at a client computer, containing an information resource pointer that refers to an address of an information resource that is accessible through a link by a receiving client computer over a network;
    comparing, by the client computer, the information source pointed to by the pointer message to a client profile stored on the client computer;
    determining a content score of the pointer message based on the comparison;
    totaling a number of times that the information resource pointer is transmitted by a sending computer over the network, over a predetermined time period to generate a total;
    determining a popularity score of the pointer message based on the total;
    determining an aggregated score based on the content score and the popularity score of the pointer message; and
    displaying the pointer message and the aggregated score on the client computer.

12. The method of claim 11:
    wherein the totaling element includes totaling a number of times that the information resource pointer is received by the client computer, from a prior time up until a day on which the totaling element is effected.

13. A method for software execution for information discovery, comprising:
    receiving a pointer message by a client computer, the pointer message containing an information resource pointer that refers to an address of an information source that is accessible by a receiving client computer over a network;
    comparing the information resource pointed to by the pointer message to a client profile stored on the client computer;
    determining a content score of the pointer message based on the comparison;
    initializing a timeliness score to a maximum value;
    decrementing the timeliness score by a predetermined percentage each time a predetermined time period elapses after a first transmission of the pointer message by a sending computer;
    determining an aggregated score based on the content score and the timeliness score; and
    displaying the pointer message and the aggregated score on the client computer.

14. A method for software execution for information discovery, comprising:

generating a client profile on a receiving client computer;
storing the client profile on the receiving client computer;
receiving, by the receiving client computer, a pointer message containing an information resource pointer that refers to an address of an information source that is accessible by the receiving client computer over a network;
comparing the information source pointed to by the pointer message to the client profile stored on the client computer;
determining a content score of the pointer message based on the comparison;
totaling a number of times that the information resource pointer is received by the receiving client computer, over a predetermined time period, yielding a popularity score;
initializing a timeliness score to a maximum value;
decrementing the timeliness score by a predetermined percentage each time a predetermined time period elapses after a first transmission of the pointer message by a sending client computer;
aggregating the content score, the popularity score, and the timeliness score to generate an aggregated score; and
displaying the pointer message and the aggregated score on the receiving client computer.

15. The method of claim 14:
further comprising, defining a set of blocked information resources; and
wherein the displaying element includes displaying the pointer message if the pointer does not include an address for one of the blocked information resources.

16. The method of claim 14,
further comprising, defining a set of hierarchically blocked information resources; and
wherein the displaying element includes displaying the pointer message if the pointer does not include an address referring to either the blocked information resources or an information resource within one of the blocked information resources.

17. A computer system for information discovery comprising:
a processor; and
a memory storing machine readable instructions, which when executed by the processor cause the computer system to:
generate a client profile on a client computer;
store the profile on the computer;
receive a pointer message containing an information resource pointer that refers to an address of an information resource that is accessible by a receiving client computer over a network;
compare the information source pointed to by the pointer message to the client profile stored on the client computer;
determine a content score of the pointer message based on an output of the means for comparing;
determine a total number of times the pointer message is transmitted over the network within a predetermined time period;
determine a popularity score of the pointer message from the determined total number of times;
determine an aggregated score based on the content score and the popularity score of the pointer message; and
display the pointer message and the aggregated score on the computer.

18. A computer system for information discovery, comprising:
a processor; and
a memory storing machine readable instructions, which when executed by the processor cause the computer system to:
receive a pointer message at a client computer, containing an information resource pointer that refers to an address of an information resource that is accessible through a link by a receiving client computer over a network;
compare the information source pointed to by the pointer message to a client profile stored on the client computer;
determine a content score of the pointer message based on an output of the means for comparing;
total a number of times that the information resource pointer is transmitted by a sending computer over the network, over a predetermined time period, to generate a total;
determine an aggregated score based on the content score of the pointer message and the total; and
display the pointer message and the aggregated score on the computer.

19. A computer system for information discovery, comprising:
a processor; and
a memory storing machine readable instructions, which when executed by the processor cause the computer system to:
receive a pointer message at a client computer, the pointer message containing an information resource pointer that refers to an address of an information pointer that is accessible by a receiving client computer over a network;
compare the information resource pointed to by the pointer message to a client profile stored on the client computer;
determine a content score of the pointer message based on the comparison;
initialize a timeliness score of the pointer message to a maximum value;
decrement the timeliness score by a predetermined percentage each time a predetermined time period elapses after a first transmission of the pointer message by a sending computer;
determine an aggregated score based on the content score and the timeliness score of the pointer message; and
display the pointer message and the aggregated score on the client computer.

* * * * *